Figure 1:
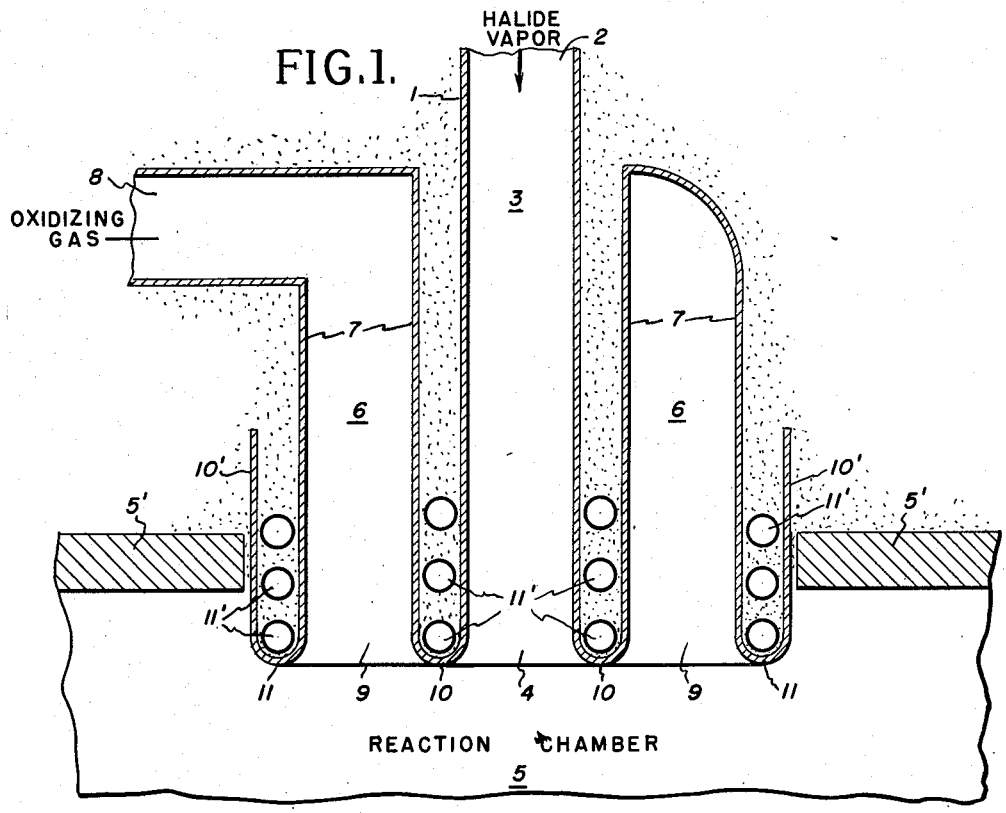

Sept. 22, 1953 F. W. LANE 2,653,078
METAL OXIDE PRODUCTION
Filed Jan. 2, 1951

INVENTOR.
Frank W. Lane
BY
ATTORNEY.

Patented Sept. 22, 1953

2,653,078

UNITED STATES PATENT OFFICE 2,653,078

METAL OXIDE PRODUCTION

Frank W. Lane, Elkton, Md., assignor to E. I. du Pont de Nemours and Company, Wilmington, Del., a corporation of Delaware Application January 2, 1951, Serial No. 203,871

12 Claims. (Cl. 23—139)

This invention relates to metal oxide manufacture through the decomposition of a volatile metal halide, and more particularly to the production of pigmentary titanium dioxide by the vapor phase oxidation of a titanium halide, especially titanium tetrachloride, under controlled conditions of reaction.

The vapor phase reaction of volatile metal halides at elevated temperatures with an oxygen-containing gas to produce a metal oxide is well known. For example, the chlorides of titanium, iron, aluminum, and the like can be reacted with oxygen at from 700° C.–1350° C. and the corresponding oxides of such metals obtained. In carrying out this reaction, the metal halide and oxidizing gas are separately introduced into a mixing and reaction zone so that prompt and thorough admixture of such reactants will occur. If quick mixing is not had, particularly in a titanium tetrachloride oxidation, an incomplete reaction will result, and, in consequence, the particle size, uniformity, and other essential pigment properties of the final $TiO_2$ product will be adversely affected. Where the reactor inlets are arranged to insure such rapid mixing, a further difficulty arises due to formation upon such inlets of an objectionable, hard, crystalline oxide deposit. This deposit "grows" as the reaction proceeds to objectionably hinder the oxidation operation or eventually interrupts it altogether due to the apparatus plugging which it induces. In addition, objectionable oxide formation and deposition takes place on the internal walls of the reactor to constrict its cross section whereby the average retention time of reactants within the reactor is undesirably altered and modified so that the particle size of the resulting metal oxide reaction product is also adversely affected. As in the case of the reactor inlets, this wall deposition may eventually cause reactor plugging. This oxide deposition and apparatus plugging constitutes a major obstacle to a successful, continuous type of commercial operation for the production of metal oxides, and especially $TiO_2$, by gas phase oxidation processes.

Many proposals have been made for overcoming these difficulties of prior vapor phase oxidation methods, including dilution of a reactant prior to use; maintenance of the reacting gas mixture out of contact with the hot surfaces of the reactor and by means of an intervening inert gas stream; employment of oppositely disposed vapor inlets to the reactor; utilization of such reactant flow rates that the reaction products will be swept past the halide reactant inlet; or utilizing a relatively large reaction zone wherein reactant wall contact will be minimized. However, none of these proposals has proved satisfactory or effective for overcoming the difficulties above alluded to in prior vapor phase oxidation procedures.

Figure 2:
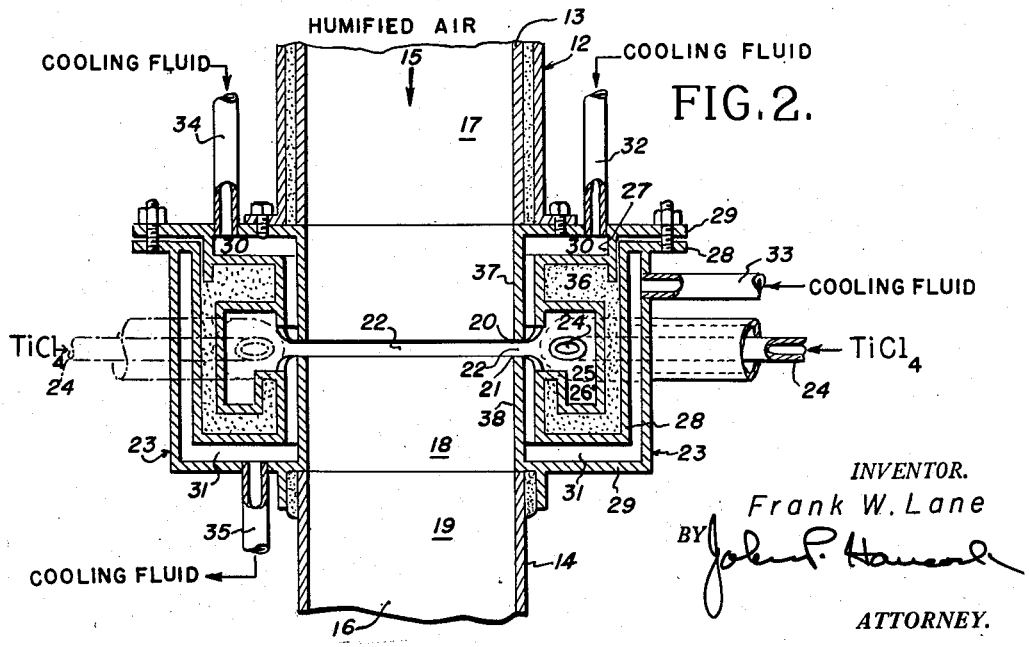

It is among the objects of this invention to overcome the above and other disadvantages which characterize prior methods for oxidizing volatile metal halides, and particularly those which are encountered in titanium tetrachloride oxidations. It is among the particular objects of this invention to provide novel methods and means for accomplishing these objects as well as to provide novel and effective methods and means for preventing oxide-encrusted deposits from forming upon and adhering to the reaction zone inlets of a reactor employed in a volatile metal halide, and especially a $TiCl_4$ oxidation; to provide a novel method for effecting the continuous production of high-quality metal oxides in desirably high, commercial yields, without encountering the objectionable interruptions or shutdowns due to apparatus plugging; to provide novel methods and means for effecting the rapid and thorough admixture and reaction in the gas phase of titanium tetrachloride and an oxidizing gas without the attendant difficulties which oxide deposition and scale formation would induce if allowed to occur; and to provide a novel and continuous type process for producing pigment-quality $TiO_2$ from a $TiCl_4$ oxidation. Other objects and advantages of the invention will be apparent from the ensuing description and from the accompanying diagrammatic drawings wherein Figure 1 is a vertical, sectional view of one useful form of apparatus in which the invention can be carried out; while Figure 2 is a vertical sectional view of a modified form of apparatus in which the invention can also be carried out.

These and other objects and advantages are obtainable in this invention which comprises vapor phase reacting a volatile metal halide with an oxidizing gas within a reaction zone, and during the reaction maintaining the reactant inlets to said zone at a temperature below that at which any substantial reaction will occur between said reactants but above the vaporization temperature of the halide reactant.

In a more specific embodiment, the invention comprises rapidly mixing and reacting titanium tetrachloride and a humidified oxidizing gas at temperatures ranging from about 900–1200° C.

within a reaction zone, and throughout said reaction maintaining the discharge section of the walls of the reactant zone inlets at a temperature below 800° C., and preferably below 700° C., by continuously flowing a cooling fluid thereover but out of contact with said reactants.

As already noted, useful forms of apparatus in which the invention can be practiced are illustrated in the accompanying drawings. Such apparatus comprises vertical types of concentric jet or nozzle forms of reactors wherein a gaseous metal halide, particularly $TiCl_4$, and an oxidizing gas such as humidified air can be readily and quickly mixed for desired reaction and oxidation of the halide. Preferably, these reactors are constructed of corrosion-resistant metal or alloys and are adapted to be lined, if desired, with a ceramic or refractory material, such as silica, magnesia, porcelain, etc., also capable of withstanding relatively high temperatures and the attack of corrosive fluids.

Referring particularly to Fig. 1, a reactor inlet is shown composed, preferably, of silica or other corrosion-resistant material, said inlet being provided with an elongated, tubular conduit 1, an inlet 2, a fluid passage 3, and an orifice or nozzle outlet portion 4 which discharges into a reaction zone 5 of a reaction chamber relatively restricted in cross section. Concentrically arranged about the conduit 1 so that a second fluid passage 6 is formed is an annular conduit 7 having an inlet 8 and an orifice or outlet 9, the latter also discharging into the reaction zone 5. The external walls of conduit 1 facing those of conduit 7 in which conduit 1 is interposed are spacedly disposed from those of conduit 1 but at their point of lowermost descent into the reaction zone 5 can be conveniently united, as shown, to form outlet tip portions 10. Similarly, the outer wall of conduit 7 adjacent to or contiguous with the reaction chamber wall 5' is so arranged that it also partially extends into reaction zone 5 but in the form of a U-bend 10', the lower extremity of which bend terminates in a tip portion 11. Suitably positioned within U-bend 10' and the space formed between the opposing wall surfaces of the conduits 1 and 7 and extending for a relatively short distance over the exterior of said conduits from the tip or lip portions 10 and 11, respectively, is a bank or plurality of tubular cooling coils 11' through the medium of which said tips and the outlet passages 4 and 9 can be maintained in relatively cool condition throughout the oxidation reaction. The bank or banks of cooling coils 11' can be made up of a suitable metal possessing a relatively high thermal conductivity and adapted to promote rapid heat transfer or dissipation, such as copper, silver, aluminum, or like metallic substance. The coils 11' are in such numbers and so arranged about the orifice outlets 4 and 9 and especially about said lip portions that desired and efficient cooling thereof will be had without incurring any undue cooling of the preheated reactants prior to their introduction into the reaction zone after flowing through the passages 3 and 6.

In operating such Fig. 1 device, a suitable cooling medium such as cold water is continuously flowed through the coils 11' whereby the lower parts of the walls of the conduits 3 and 6 adjacent the outlets 9 and 10 and the reaction chamber 5 are maintained in relatively cool condition, e. g., at a temperature below 800° C., and preferably below 700° C., in the instance of a $TiCl_4$ oxidation. A volatile metal halide, such as titanium tetrachloride, and an oxygen-containing gas, such as humidified air, preheated to temperatures ranging from 800–1000° C. are then separately and continuously fed, at independently controlled rates of flow, from suitable sources of supply (not shown) through the conduits 3 and 6, respectively, to discharge through the orifice outlets 4 and 9 into the reaction zone 5. In consequence, desired mixture of the reactants takes place with reaction therebetween occurring within the reaction zone at temperatures ranging from 900–1200° C., with complete oxidation of the halide being effected. The gaseous products of reaction formed in the zone 5 and containing the desired titanium dioxide product in suspension are continuously withdrawn from the reactor and subjected to a conventional recovery operation following their quick cooling or quenching to a temperature below 600° C., essential in a $TiO_2$ pigment production operation to prevent undesired particle size growth which would adversely affect the ultimate pigment properties and usefulness of the final product. The product is then treated in conventional separatory apparatus including collecting means such as settling chambers, filters, electrostatic precipitators, or the like. Prior to its use as a pigment, the $TiO_2$ is subjected to further treatment, including calcination to effect residual chlorine removal. The residual gaseous products consisting of a halogen and any unreacted portions of the starting materials can be concentrated, if desired, to provide a gas having a higher proportion of halogen; or, depending upon the reaction conditions, they can be reemployed in the process without recourse to such concentrating treatment.

To a clearer understanding of the invention, the following specific examples are given, which are merely illustrative and not to be construed as in any wise limiting the invention:

*Example I*

Titanium tetrachloride and dry oxygen, after being preheated to 1000° C., were separately and continuously admitted in the molar ratio of 1:1 to a concentric jet reactor such as that shown in Fig. 1, the jet elements of which were constructed of fused silica. The reaction chamber was maintained at 1000° C., and throughout the reaction water was continuously circulated through a copper coil disposed about the concentrically arranged inlets, said fluid being in sufficient quantity and in such state of coolness as to maintain the inner silica walls of the discharge section of the inlet jets at a temperature of 700° C. The products of reaction, containing $TiO_2$ in suspension, were discharged from the reaction chamber into a settling vessel associated with the reactor where most of the $TiO_2$ was retained, and were then passed through a glass cloth filter to an exhauset hood for recovery. After two hours of operation, the flow of reactants was discontinued, the reactor was cooled, disassembled, and its reactant inlet nozzles and interior inspected to determine whether oxide deposition thereon had taken place during the run. It was found that conversion of the $TiCl_4$ to the oxide was substantially complete and that only a relatively small, insignificant amount of powdery $TiO_2$ deposit had formed on the tip 10 of the central tubular conduit, and that such deposit was readily removable upon brushing, also that its presence was not of sufficient magnitude to interfere in any appreciable degree with the proper mixing and reaction of the reactants fed to the reactor.

After inspection, the apparatus was reassembled and the foregoing operation was repeated therein except that no water or other cooling fluid was circulated through the cooling coil during the reaction. After a short period of operation, the oxygen flow rate and to an even greater extent the titanium tetrachloride flow rate were found to have become considerably reduced. After two hours, the operation was interrupted. The apparatus was then cooled, dismantled, and inspected. A hard encrustation or scale deposit was found to have formed on the tips 10 and 11 of the concentric jets through which the titanium tetrachloride and oxidizing gas reactant had been admitted. This deposit projected out for a distance of nearly two inches from the tip of the nozzles, gradually narrowing down at the end projecting into the reaction chamber to nearly close off the tubes. This deposit was very difficult to remove. In contrast to the substantially complete conversion obtained in an operation in which resort was had to cooled reactor inlets, only about 60% conversion of TiCl₄ to the oxide was obtained in this instance, indicating clearly that deposit presence on the inlet nozzles objectionably interfered with proper reactant mixing and undesirably reduced and impaired unit capacity and efficiency by cutting down reactant flow rates.

In Figure 2 a modified form of apparatus is shown wherein rapid reactant mixing and reaction can be readily obtained. It comprises a water or other circulating fluid-cooled type of jet reactor 12, preferably constructed of nickel or other suitable corrosion-resistant metal or alloy adapted to be lined with a refractory material such as those referred to, and in which a plurality of open-ended tubular conduits or section members 13 and 14 are provided with an inlet 15 and an outlet 16. Said section members 13 and 14 are so arranged or disposed that they form a fluid passage 17, a mixing zone 18, and a reaction zone 19. The lower end portion or terminus 20 of member 13 and the upper end portion or terminus 21 of the member 14 are disposed in spaced, juxtaposed relationship from each other to form a relatively restricted, perimetric, transverse opening or elongated circumferential slot 22 for separately charging a fluid reactant into the conduit 17, mixing zone 18, and reaction zone 19, wherein it will be admixed for reaction with a suitable reactant adapted to be separately charged through the inlet 15 into said conduit, mixing zone and reaction zone. Fixedly or otherwise secured to and about said section members 13 and 14 and extending a relatively short distance above and below and enclosing the inlet slot 22 is a manifold 23. The latter is provided with an inlet 24 and an internal chamber or fluid passage 25 which are in open communication with said slot 22 as well as the passage 17, mixing zone 18, and reaction zone 19. Said passage 25 of the manifold 23 surrounds said slot 22 and preferably is lined with silica or other corrosion-resistant material 26, and is formed by cooperatively arranging the section members 27 and 28 adapted to be bolted or otherwise suitably secured to the manifold walls 29. Section members 27 and 28 are disposed, as shown, in spaced relationship from walls 29 to form cooling ducts or fluid passages 30 and 31 provided with inlet conduits 32 and 33, respectively, and outlet conduits 34 and 35, respectively. A heat insulating material such as powdered silica 36 is disposed between the silica chamber 26 and the walls of section members 27 and 28.

In the operation of this Figure 2 device to produce, for example, a titanium dioxide pigment by vapor phase reacting, say, titanium tetrachloride with an oxidizing gas such as moisture-enriched air, a suitable cooling fluid such as water or oil is first charged and continuously conveyed during the reaction through inlets 32 and 33 and the ducts or channels 30 and 31, to maintain the temperature of the inner metal wall 37 (which preferably consists of nickel) of the jet adjacent the mixing and reaction zones at a temperature from just above the condensation temperature of TiCl₄ to just below the temperature where corrosion and resulting contamination of the pigment may objectionably occur, e. g., from about 140° C. to 325° C. The oxidizing gas, at a temperature above 350° C., is then separately and continuously fed at a controlled rate into inlet 15 for charge through the passage 17. Simultaneously, gaseous titanium tetrachloride, at a temperature approximating that of the oxidizing gas, is separately and continuously conducted at a velocity ranging from about 15–40 times the mass velocity of the oxidizing gas, through manifold inlet 24 and passage 25 and discharged in the form of a relatively thin sheet or stream through the slot inlet 22 flowing radially from the outer periphery of passage 17 towards the center thereof and at right angles to and across the axis of flow of the oxidizing gas charging therethrough. Substantially instantaneous reactant mixing and reaction at temperatures ranging from about 900–1200° C. occurs on the two fluids coming together within the oxidation zone, and the reaction is substantially complete upon their passage downstream a short distance from the slot inlet 22. The reactants and resulting reaction products remain in the oxidation zone for but a relatively short (from about .1–10 seconds) period which prevents undesired TiO₂ particle size growth and yet affords complete conversion of the TiCl₄. The gaseous reaction products containing the TiO₂ in suspension are quickly cooled to below 600° C. on discharge from the oxidation zone, which quenching also prevents undesired particle size growth. In effecting cooling, cooled product gases from the system can be recirculated and directly commingled with the TiO₂ suspension as it issues from the oxidation zone, or, if preferred, cold, inert, finely divided refractory solids, such as silica or the like, can be directly dispersed in the suspension. The cooled TiO₂ product is then conventionally recovered by passing it into suitable settling chambers, cyclone separators, or the like. Such product consists of a uniformly small particle size pigment possessing desired high tinting strength, color, opacity, and other essential properties. It will be found adaptable for use in all types of pigment applications, including paints, enamels, finishes, or other coating composition formulations, as a delusterant for rayon or other artificial fibers and silks and as a colorant in printing inks, rubber, and the like.

The following is an illustrative example of an embodiment of the invention employing a Figure 2 reactor such as that just described:

*Example II*

The jet wall portions 37 and 38 of the reactor were constructed of nickel and throughout the run were maintained in cool condition and at about 200° C. by continuously flowing sufficient cool petroleum oil through the cooling jackets 30 and 31. The tubular passage 17 of the reactor had an internal diameter of 1¾" and its slot inlet 22 was 3/32 of an inch in width and extended completely about the periphery of said passage. Air containing .95% H₂O by volume, preheated to a temperature of 800° C., was continuously charged through passage 17 at a rate equivalent to 19 parts by weight of O₂ per hour. Vaporized TiCl₄ at a temperature of 865° C. was simultaneously fed, at a continuous constant flow rate of 100 parts by weight per hour through the passage 24 of manifold 23 and discharged into the passage 17 through the slot inlet 22 in the form of a sheeted stream and across the air stream being concurrently conveyed through that passage. Substantially instantaneous mixing of the humidified air and TiCl₄ reactants took place at the point of their meeting with substantially complete mixing and reaction (at a temperature of 1150° C.) occurring downstream at a point 2" below the slot inlet 22. Since the gas streams converge substantially immediately after entering the mixing zone, the flow rates used provided an average retention time of reactant gases and products within the reactor of .13 of a second. The TiO₂ suspension issuing from the bottom of the reactor at a temperature of about 1000° C. was quenched to 300° C. within 2 seconds by directly commingling sufficient cold chlorine gas therewith. The TiO₂ product was then separated and recovered from the cooled reaction products in conventional type filters and consisted of a high grade rutile pigment. After a run of 3 hours during which no difficulties were experienced in maintaining reactant flow rates and a continuous type of operation, further reactants flow was discontinued and the apparatus was disassembled for inspection. No oxide scale deposition or build-up was found to have occurred on any part of the cooled inlet nozzle walls or jet tips and advantageously a substantially 100% TiCl₄ conversion was found to have been obtained.

As a further illustration of an operation utilizing the apparatus of Fig. 1, the following specific example is given:

*Example III*

Ferric chloride vapor and dry oxygen gas, after being preheated to 900° C., were separately admitted through water-cooled fused silica nozzle inlets of the reactor, the reaction zone of which was held at 900° C. The flow of oxygen to the apparatus was adjusted to give a 50% excess over that required by the equation:

$$2FeCl_3 + 1\tfrac{1}{2}O_2 \rightarrow Fe_2O_3 + 3Cl_2$$

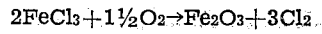

Water was continuously circulated during the reaction through the cooling jackets to maintain the inlet jet walls at a temperature of about 300° C. No difficulties were encountered in maintaining the gas flow rates. After running for 90 minutes, further flow of reactants was discontinued and the apparatus disassembled for inspection. No oxide scale deposition was found to have occurred on any part of the cooled nozzle walls or inlet tips and a substantially complete conversion was found to have been effected.

The apparatus was reassembled and the foregoing operation was repeated under identical conditions, except that no cooling of the reactant inlets was resorted to. Within a short time after commencement of the run, difficulty was experienced in maintaining the prescribed reactant flow rates and the gas flow was stopped completely after 65 minutes of operation. Upon disassembling the apparatus, it was found that its reaction zone inlet nozzles will be completely plugged due to the presence of a tightly adhering hard, scaly oxidic deposit upon their discharge surfaces. Removal of this deposit from the nozzles could only be effected by acid treatment which was necessary to avoid apparatus breakage.

Although described as applied to certain specific embodiments, it will be understood that the invention is not restricted thereto. Thus, while particularly adaptable to a continuous type of operation, it is apparent that the contemplated oxidation reaction can also be effected in a batch or semi-continuous manner or under atmospheric, superatmospheric, or subatmospheric pressures. It is especially useful for preparing pigmentary TiO₂ in rutile or anatase crystalline form, particularly through the decomposition of a titanium chloride, such as TiCl₄, at temperatures in excess of 800° C. and from, say, 900–1350° C., with an oxidizing gas such as oxygen, oxygen-enriched air, or with mixtures of oxygen-enriched air and an inert gas. Preferably, and to obtain an optimum form of TiO₂ pigment, the oxidation is effected in accordance with the procedures of U. S. Patent 2,488,439, issued November 15, 1949, wherein use is resorted to of an oxidizing gas containing small amounts (ranging from .05–10%, and especially from .1–5% by volume, based on the total volume of reactants) of water vapor. Likewise, a co-oxidation procedure can be resorted to, such as in accordance with the disclosure of the copending application of I. J. Krchma and H. H. Schaumann, Ser. No. 763,738, filed July 25, 1947, in which regulated, small amounts, say, from .05–10% by volume, based on the total volume of gases being reacted, of aluminum chloride are also present to provide an aluminum-containing TiO₂ pigment substantially neutral in pH value.

While titanium tetrachloride comprises a preferred halide reactant for use in the invention, if desired other volatile titanium chlorides or halides as well as the volatile chlorides or halides of other metals, or mixtures thereof, can be used, provided the halogen component of the halide employed has an atomic number greater than 9 (i. e., chlorine, bromine, iodine). Among examples of such additionally useful halides, those of zirconium, aluminum, chromium, vanadium, tin, zinc, tungsten, antimony, columbium, tantalum, etc., can be mentioned. The halide reactant can be readily prepared by, for example, chlorinating an ore or other metalliferous substance containing the metal the halide of which is to be prepared. Thus, titanium tetrachloride or ferric chloride can be obtained by chlorinating a titaniferous material such as ilmenite, rutile, or a TiO₂ concentrate at from 600–1100° C. in the presence of a solid or gaseous reducing agent such as carbon, charcoal, coal, etc., and thereafter fractionally distilling the mixed chlorides reaction product to recover the desired titanium or ferric chloride in pure state.

Although the inlet jets and their associated parts where objectionable oxide scale deposition or build-up is likely to occur are preferably cooled by continuously flowing or circulating cold water as a cooling medium through one or more nickel or other type jacketing means or coils surrounding such inlets, said inlets, nozzles, conduits and their associated parts can be cooled by resorting to other fluid cooling media and can be constructed of various other metals, alloys, or ceramic or refractory materials possessing corrosion resistance and heat conductivity characteristics. Thus, use is contemplated of any form of conventional cooling media including inorganic or organic heat exchange fluids. For instance, in addition to water, glycerin, alcohol, various well-known petroleum and lubricating oils, fused salts, steam, etc., can be employed. Similarly, in addition to nickel type coils or jacketing means, the latter can consist wholly or in part of silver, magnesium, platinum, aluminum, or stainless steel or corrosion-resistant alloys, etc.

Any desired vapor inlet arrangement can be utilized in practicing the invention, provided it will afford the rapid and thorough mixing of the reactants which is being sought. These may comprise, as shown in the drawings, concentric type inlet tubes, or may consist of parallel, juxtaposed inlets, or non-parallel inlets so arranged that the gas streams meet at some point in the reactor. The halide and oxidizing gas may each be introduced into the reactor through separate nozzles, or a plurality of separately cooled inlets may be resorted to for one or both reactants. For instance, the oxidizing gas may be introduced into the reaction zone through a plurality of inlets angularly disposed in respect to each other and to the metal halide inlet whereby such gas will impinge on the halide stream from opposing sides and at a particular point within the reaction chamber.

The invention possesses the important advantage over attempts of prior processes to avoid encrusted oxide deposition on reactor inlets and surfaces in that oxidic deposition is obviated or minimized without any interference arising in the desired rapid mixing operation. Furthermore, a desired high conversion of the halide to the metal oxide of desired uniformly small particle size and other essential properties is had without any attendant shut-downs due to apparatus plugging from such deposition. As a result, the invention is outstandingly useful in the production of high-quality anatase or rutile $TiO_2$ pigments, especially when employed in conjunction with the methods contemplated in the aforesaid H. H. Schaumann application, directed to the vapor phase decomposition of titanium tetrachloride under controlled oxidation conditions and in the presence of small quantities of water vapor or humidified air.

While I preferably effect jet cooling by continuously circulating liquid or vaporous type of heat exchange media through metal jackets or coils associated with the reactor inlet nozzles or jets, this can also be accomplished by spraying the liquid media onto and over the exterior surfaces of the inlet ducts or reactor walls and out of contact with the reactants employed in the oxidation. Similarly, such media may be continuously flowed as a thin sheet or stream over the surfaces of the conductor metal or jacket and opposite to the surfaces over which the reactant gases flow or pass. A heat exchange system can also be used wherein the cooling medium is recirculated after use and employed to partly preheat the cold halide and oxidizing gas reactants prior to use. Furthermore, a single reactant inlet or a portion of two or more thereof can be independently cooled to differing temperatures, whereby the reaction or condensation temperatures of the reactant being fed therethrough will be avoided.

In the cooling operation the inlets and walls of the reactor should be cooled only to a point which is sufficiently above the vaporization point of the halide reactant and which will avoid any reactant condensation upon the inlet or reactor surfaces. Obviously, the extent or degree of cooling in any given instance will depend upon the nature of the metal halide being oxidized, the temperature at which its interaction with the oxidizing gas will take place, and the temperature at which corrosion of the jet material of construction is objectionable. In a titanium tetrachloride oxidation using a fused silica jet, I maintain the affected inlets and reactor walls at temperatures below 800° C., and with a nickel jet at from about 137° C. to 325° C. In ferric chloride oxidations, I resort to reactor inlet and wall temperatures of not below 300° C. and preferably maintain temperatures ranging from about 300° C. to 500° C.

I claim as my invention:

1. A method for preventing metal oxide scale deposition and build-up upon the surfaces of inlets to a reactor employed in the vapor phase oxidation at temperatures above 700° C. of a volatile metal halide with an oxidizing gas which comprises during said oxidation flowing out of contact with the reactants a cooling fluid about said inlets to maintain them in cooled state and at a temperature substantially below said oxidation temperature but above the vaporization temperature of the halide reactant.

2. A method for overcoming oxide scale build-up upon the surfaces of inlets to a reaction zone in which a vaporized metal halide is reacted in the vapor phase and at temperatures above 700° C. with an oxygen-containing gas, comprising throughout the reaction flowing a cooling fluid about said inlets but out of contact with said reactants, said fluid being at such temperature and in such amount that the surfaces of said inlets are maintained at a temperature substantially below that at which said halide and oxidizing gas will react but above the temperature necessary to maintain the halide reactant in the vaporous state.

3. A method for overcoming oxide scale build-up within a reactor employed in the vapor phase oxidation at a temperature above 800° C. of a titanium halide with an oxygen-containing gas, which comprises throughout said oxidation continuously flowing a cooling medium about the reaction zone inlets and their associated reactor wall surfaces but out of contact with said reactants, said medium being at such temperature and in such amount that said inlets and surfaces are maintained at a temperature substantially below that at which said halide and oxidizing gas will react but above the temperature necessary to maintain the halide reactant in vapor state.

4. A method for overcoming oxide build-up upon the surfaces of inlets to a reaction zone wherein vaporized titanium tetrachloride is reacted at a temperature above 800° C. with an oxidizing gas, comprising during said reaction flowing a cooling fluid about said inlets out of contact with said reactants to maintain the wall surfaces of said inlets at a temperature substantially below that at which said chloride and said oxidizing gas will react but above the temperature necessary to maintain said tetrachloride in the vapor state.

5. A method for overcoming oxide scale build-up upon the surfaces of the reaction zone inlets through which vaporized titanium tetrachloride and an oxidizing gas are separately introduced into said zone for reaction which comprises during said reaction maintaining the walls of said inlets with which said chloride and oxidizing gas come in contact during their introduction into and reaction within said zone at a temperature substantially below that at which interaction between said oxidizing gas and chloride will occur but above a temperature necessary to maintain said chloride in a vapor state by continuously flowing a cooling medium about said inlets out of contact with said reactants.

6. A method for overcoming oxide scale build-up upon the surfaces of the reaction zone inlets through which vaporized ferric chloride and an oxidizing gas are separately introduced into said zone for reaction which comprises during said reaction maintaining the walls of said inlets with which said chloride and oxidizing gas come in contact during their introduction into and reaction within said zone at a temperature substantially below that at which interaction between said oxidizing gas and chloride will occur but above a temperature necessary to maintain said chloride in a vapor state by continuously flowing a cooling medium about said inlets out of contact with said reactants.

7. A process for overcoming oxide deposition and build-up upon the surfaces of inlets to a reaction zone through which vaporized titanium tetrachloride and an oxidizing gas preheated to a temperature of at least 800° C. are separately passed for reaction within said zone at temperatures ranging from 900–1200° C., which comprises maintaining the walls of said inlets at a temperature below 800° C. and that at which interaction between said tetrachloride and oxidizing gas will occur but above the temperature at which said tetrachloride will vaporize by continuously flowing a cooling fluid about said inlets but out of contact with the tetrachloride and oxidizing gas reactants.

8. A process for preventing oxide deposition and build-up upon the surfaces of inlets to a reaction zone employed in reacting vaporized titanium tetrachloride and an oxidizing gas at temperatures ranging from 900–1200° C. which comprises forming said inlets and their associated reactor wall surfaces of a corrosion-resistant metallic substance and continuously flowing a fluid cooling medium out of direct contact with said reactants over a surface of said substance opposed to the surface with which said reactants come in contact during their introduction into and reaction within said zone to maintain said latter surface at a temperature substantially below that at which chemical interaction between said tetrachloride and oxidizing gas will occur but above the temperature at which said tetrachloride will vaporize.

9. A process for preventing oxide scale deposition and build-up upon the surfaces of inlets to a reaction zone wherein titanium tetrachloride and an oxidizing gas are reacted at temperatures ranging from 900–1200° C. following their separate introduction into said zone which comprises forming said inlets of a corrosion-resistant metal and throughout the reaction circulating out of contact with said reactants a cooled heat exchange fluid continuously over the surface of said inlets which are opposed to those which come in direct contact with said reactants, said fluid being in sufficient amount to maintain the walls of said inlets at a temperature above that at which the vaporous TiCl₄ will condense but not to exceed 800° C., and below the temperature where corrosion of said metal will occur.

10. A process for minimizing oxide deposition and build-up upon the surfaces of inlets to a reaction zone through which titanium tetrachloride and an oxidizing gas, preheated to temperatures of at least 800° C., are separately conveyed for reaction, comprising forming said inlets of metallic nickel and continuously circulating a fluid cooling medium about said inlets but out of contact with said reactants to maintain said metal at a temperature not exceeding 325° C. but above 140° C.

11. A process for minimizing oxide deposition and build-up upon the surfaces of inlets to a reaction zone through which titanium tetrachloride and an oxidizing gas, preheated to temperatures of at least 800° C., are separately conveyed for reaction, comprising forming said inlets of metallic nickel and continuously circulating oil about said inlets but out of contact with said reactants to maintain said metal at a temperature ranging from 140° C. to not exceeding 325° C.

12. A process for minimizing oxide deposition and build-up upon the surfaces of inlets to a reaction zone through which vaporized ferric chloride and an oxidizing gas, preheated to a temperature of at least 700° C., are separately passed to said zone for reaction, at temperatures ranging from 700° C. to 1000° C., comprising forming said inlets of a corrosion-resistant metal and continuously circulating out of contact with said reactants and over the surfaces of said metal opposite to those with which said reactants come in direct contact sufficient liquid cooling medium to maintain the walls of said metal inlet at a temperature ranging from above that at which vaporous ferric chloride will condense and to about 500° C.

FRANK W. LANE.

References Cited in the file of this patent
UNITED STATES PATENTS

| Number | Name | Date |
| --- | --- | --- |
| 1,552,786 | Wescott | Sept. 8, 1925 |
| 1,617,074 | Matlock | Feb. 8, 1927 |
| 1,967,235 | Ferkel | July 24, 1934 |
| 2,155,119 | Ebner | Apr. 18, 1939 |
| 2,394,633 | Pechukas | Feb. 12, 1946 |
| 2,445,691 | Pechukas | July 20, 1948 |